(12) United States Patent
Lin et al.

(10) Patent No.: US 12,459,841 B2
(45) Date of Patent: Nov. 4, 2025

(54) METHOD OF PROCESSING LIQUID CONTAINING AMMONIA NITROGEN FROM SEMICONDUCTOR FABRICATION MACHINE

(71) Applicant: TAIWAN SEMICONDUCTOR MANUFACTURING COMPANY LTD., Hsinchu (TW)

(72) Inventors: En Tian Lin, Taoyuan (TW); Chiao-Ling Weng, Taichung (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 551 days.

(21) Appl. No.: 17/818,297

(22) Filed: Aug. 8, 2022

(65) Prior Publication Data

US 2024/0043295 A1     Feb. 8, 2024

(51) Int. Cl.
*C02F 1/42*     (2023.01)
*C02F 1/467*     (2023.01)
(Continued)

(52) U.S. Cl.
CPC .............. *C02F 1/4676* (2013.01); *C02F 1/42* (2013.01); *C02F 1/586* (2013.01);
(Continued)

(58) Field of Classification Search
CPC .. C02F 1/42; C02F 1/281; C02F 1/586; C02F 1/4676; C02F 2101/16; C02F 2103/346;
(Continued)

(56) References Cited

U.S. PATENT DOCUMENTS

| | | | | |
|---|---|---|---|---|
| 6,132,627 A | * | 10/2000 | Joko | C02F 1/725 |
| | | | | 210/903 |
| 2010/0051477 A1 | * | 3/2010 | Jeon | C02F 1/4672 |
| | | | | 204/228.2 |
| 2024/0278175 A1 | * | 8/2024 | Yamamoto | B01J 20/3425 |

FOREIGN PATENT DOCUMENTS

| | | | |
|---|---|---|---|
| CN | 1463253 A * | 12/2003 | .............. B01J 20/18 |
| CN | 101780421 B * | 12/2011 | |

(Continued)

OTHER PUBLICATIONS

Kim, Kwang-Wook, et al., The electrolytic decomposition mechanism of ammonia to nitrogen at an IrO2 anode, Aug. 10, 2005, Electrochimica Acta, vol. 50, Issue 22, pp. 4356-4364, doi.org/10.1016/j.electacta.2005.01.046 (Year: 2005).*

(Continued)

*Primary Examiner* — Magali P Slawski
*Assistant Examiner* — Marleigh K Kawecki
(74) *Attorney, Agent, or Firm* — WPAT LAW; Anthony King

(57) ABSTRACT

The present disclosure provides a method of processing a liquid containing ammonia nitrogen from a first semiconductor fabrication machine. The method includes: adsorbing a plurality of ammonium ($NH_4^+$) ions in the liquid; desorbing the plurality of $NH_4^+$ ions to a solution; converting a fraction of the plurality of $NH_4^+$ ions into a plurality of ammonia ($NH_3$) molecules; and electrolyzing the plurality of $NH_3$ molecules to become a plurality of hydrogen ($H_2$) molecules and a plurality of nitrogen ($N_2$) molecules.

20 Claims, 13 Drawing Sheets

(51) Int. Cl.
  *C02F 1/58* (2023.01)
  *C02F 101/16* (2006.01)
  *C02F 103/34* (2006.01)

(52) U.S. Cl.
  CPC .... *C02F 2001/425* (2013.01); *C02F 2101/16* (2013.01); *C02F 2103/346* (2013.01)

(58) Field of Classification Search
  CPC .......... C02F 2001/422; C02F 2001/425; B01J 39/00; C01C 1/00
  See application file for complete search history.

(56) References Cited

FOREIGN PATENT DOCUMENTS

| | | | | |
|---|---|---|---|---|
| CN | 102600796 B | * | 4/2014 | |
| CN | 106319555 A | * | 1/2017 | |
| KR | 960009375 B1 | * | 7/1996 | ............. C02F 1/281 |
| KR | 20150017566 A | * | 2/2015 | |

OTHER PUBLICATIONS

Vitse, Frederic, et al., On the use of ammonia electrolysis for hydrogen production, Dec. 30, 2004, Journal of Power Sources, 142 (2005) 18-26, doi:10.1016/j.jpowsour.2004.09.043 (Year: 2004).*
Zhou; CN101780421B Machine Translation (Year: 2011).*
Dong CN102600796B Machine Translation (Year: 2014).*
Hasegawa; CN1463253A Machine Translation (Year: 2003).*
Sumida; KR20150017566A Machine Translation (Year: 2015).*
Tian; XN106319555A Machine Translation (Year: 2017).*
Machine Translation—KR-960009375-B1 (Year: 1996).*

* cited by examiner

METHOD OF PROCESSING LIQUID CONTAINING AMMONIA NITROGEN FROM SEMICONDUCTOR FABRICATION MACHINE

BACKGROUND

Semiconductor wastewater needs to be treated before it can be released. A semiconductor processing liquid, typically water, may contain high levels of nitrogen ($N_2$) in the form of ammonia ($NH_3$) or ammonium ($NH_4^+$). An adsorption method is used to extract the ammonia or ammonium from the semiconductor wastewater. The adsorbed ammonia or ammonium can readily be desorbed for disposal. However, there are still industrial values to recycle the extracted ammonia or ammonium. Therefore, there is a need to develop methods for take advantages of the materials.

BRIEF DESCRIPTION OF THE DRAWINGS

Aspects of the embodiments of the present disclosure are best understood from the following detailed description when read with the accompanying figures. It should be noted that, in accordance with the standard practice in the industry, various structures are not drawn to scale. In fact, the dimensions of the various structures can be arbitrarily increased or reduced for clarity of discussion.

DETAILED DESCRIPTION

Figure 1:
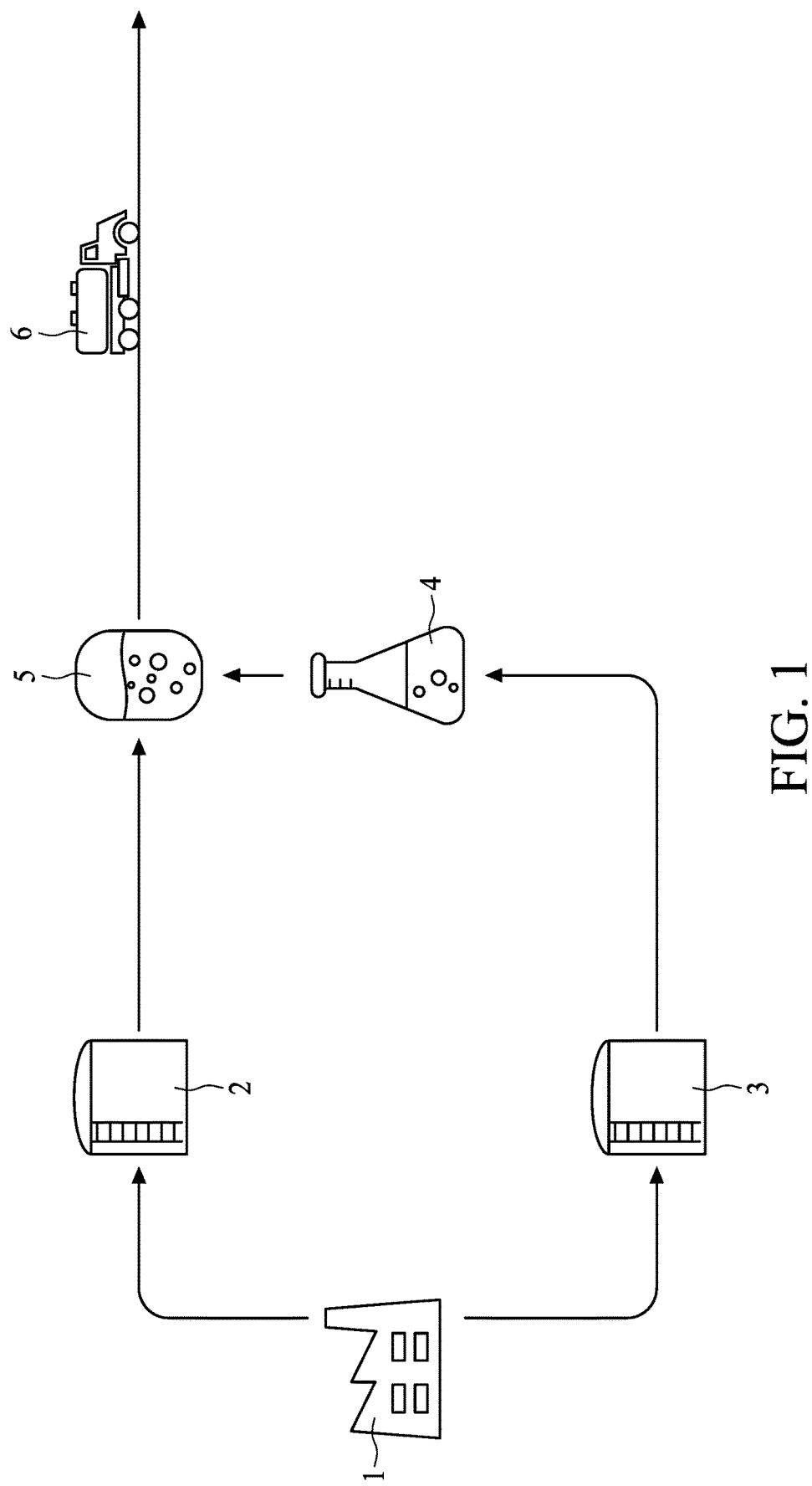
FIG. 1 is a schematic view showing a method of treating ammonia nitrogen wastewater.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features can be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "over," "upper," "on" and the like, can be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus can be otherwise oriented (rotated 90 degrees or at other orientations) and the spatially relative descriptors used herein may likewise be interpreted accordingly.

As used herein, although terms such as "first," "second" and "third" describe various elements, components, regions, layers and/or sections, these elements, components, regions, layers and/or sections should not be limited by these terms. These terms may only be used to distinguish one element, component, region, layer or section from another. Terms such as "first," "second" and "third" when used herein do not imply a sequence or order unless clearly indicated by the context.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the terms "substantially," "approximately" and "about" generally mean within a value or range that can be contemplated by people having ordinary skill in the art. Alternatively, the terms "substantially," "approximately" and "about" mean within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "substantially," "approximately" or "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

Effluent is wastewater discharged from premises such as factories. A lot of effluents from, for example, percolate, coking, synthetic ammonia or pharmacy, need to be disposed of before they can be released to the river. When the trade effluents contain a high amount of ammonia nitrogen, they would inhibit the natural nitrification, enter water body, consume the dissolved oxygen in the water body fast, cause the quick eutrophication of water body, cause the rapid deterioration of local water quality, and so on. Ammonia nitrogen (liquefied ammonia) is one of the main causes of poor water quality in many countries. Therefore, to handle the wastewater containing ammonia nitrogen is of great importance.

To treat the ammonia nitrogen in the wastewater, measures such as stripping, precipitation, denitrogenation, film absorption and wet oxidation are usually adopted.

On the other hand, hydrogen ($H_2$) has been adopted as a material in processes throughout the fab in semiconductor industry. For example, hydrogen is often used in a semiconductor manufacturing operation such as an epitaxial operation, a deposition operation, a plasma etch operation, an annealing operation, a passivation operation, an ion implantation operation, and the like. Due to the importance of hydrogen, several ways are provided to guarantee the quantity of hydrogen. For example, on-site hydrogen electrolysis uses direct current (DC) electricity to split water into hydrogen and oxygen ($O_2$). However, the cost of the electrolysis of water is relatively high because a great amount energy is needed to break water molecule bonds.

In order to solve the problems of ammonia nitrogen wastewater treatment and supply of hydrogen at the same time, an electrochemical wastewater treatment is currently experiencing both increased popularity and significant technical improvement. The electrochemical wastewater treatment a complex process involving many chemical and physical phenomenon that use consumable electrodes to supply ions into the wastewater.

Ammonia nitrogen wastewater is originally to be removed after its treatment. The present disclosure provides a method of electrolyzing ammonia from ammonia nitrogen wastewater to produce hydrogen. The method of the present disclosure can both treat the ammonia nitrogen wastewater and produce hydrogen gas. The method can reduce the treatment cost of ammonia nitrogen wastewater and also reduce the production cost of hydrogen production on by electrolysis of water. Ammonia nitrogen wastewater treatment needs to add liquid alkali to adjust the pH first, so that the ammonium ions in the water are converted into gaseous ammonia molecules. Sulfuric acid is added to convert the gaseous ammonia to ammonium sulfate after degassing.

Hydrogen gas has been adopted as a material in processes throughout the fab. For example: epitaxy, deposition, plasma etch, anneal, passivation, ion implantation, or carrier gas. In addition, extreme ultraviolet (EUV) lithography adds to increasing hydrogen demand at leading-edge fabs. For the importance of hydrogen, several providing ways to guarantee the quantity. On-site hydrogen electrolysis uses direct current electricity to split water into hydrogen and oxygen. Electrolysis is relatively expensive because of the energy needed to break water molecule bonds.

The ammonium ion in the ammonia nitrogen wastewater treatment system is released into a high-concentration ammonium ion liquid after being adsorbed by the adsorption material, and the pH is adjusted to more than 11 at room temperature, or the pH is adjusted to more than 10 at 40° C., and the ammonium ion is converted into gaseous ammonia molecules, which are decomposed into hydrogen and nitrogen by electrolysis reaction. Hydrogen can be used as backup capacity or incorporated into the hydrogen supply system for use in the process. After the process is used, the hydrogen can be incorporated into the fuel supply system to reduce fuel consumption.

FIG. 1 is a schematic view showing a method of treating ammonia nitrogen wastewater. When ammonia nitrogen wastewater and waste sulfuric acid are released from semiconductor fabrication machines of a factory 1, the ammonia nitrogen wastewater and the waste sulfuric acid may be respectively collected in a wastewater tank 2 and a waste sulfuric acid tank 3. The pH value of the ammonia nitrogen wastewater can be adjusted by adding an alkaline solution such as sodium hydroxide (NaOH) to the wastewater tank 2. The waste sulfuric acid may be recycled, for example, by removing its impurities such as metal ions to form a purified sulfuric acid 4. The purified sulfuric acid 4 can be used as an adsorbent and mixed with the ammonia nitrogen wastewater in a reaction tank 5. A chemical reaction may occur between the ammonium ions in the ammonia nitrogen wastewater and the sulfuric acid to produce ammonium sulfate (($NH_4$)$_2SO_4$). The formation of ammonium sulfate may reduce the toxicity of ammonia nitrogen wastewater. The ammonium sulfate can then be transported out by a truck 6. The cost of the treatment of ammonia nitrogen wastewater from the factory 1 may be too high since the method requires repeated addition of alkaline solution and purification of waste sulfuric acid.

Figure 2:
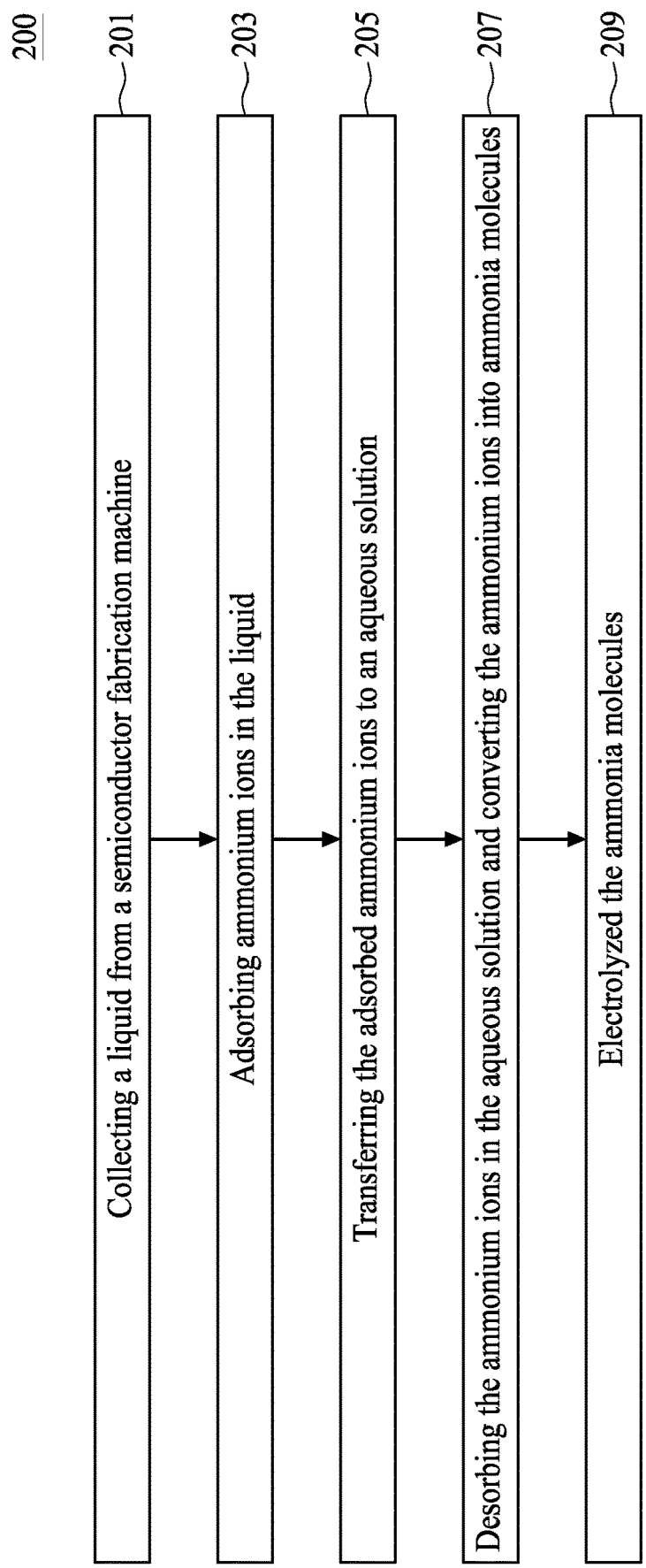
FIG. 2 is a flow diagram showing a method of processing ammonia nitrogen wastewater from a semiconductor fabrication machine, in accordance with some embodiments of the present disclosure.

FIG. 2 is a flow diagram showing a method 200 of processing ammonia nitrogen wastewater from a semiconductor fabrication machine. FIGS. 3 to 13 are schematic views illustrating sequential operations of the method 200 shown in FIG. 2. The method 200 includes a number of operations (201, 203, 205, 207 and 209) and the description and illustration are not deemed as a limitation to the sequence of the operations. A liquid is collected from a semiconductor fabrication machine in operation 201. Ammonium ions in the liquid are adsorbed in operation 203. The adsorbed ammonium ions are transferred to an aqueous solution in operation 205. The ammonium ions are desorbed in the aqueous solution and converted into ammonia molecules in operation 207. Ammonia molecules 90 are electrolyzed in operation 209.

Figure 3:
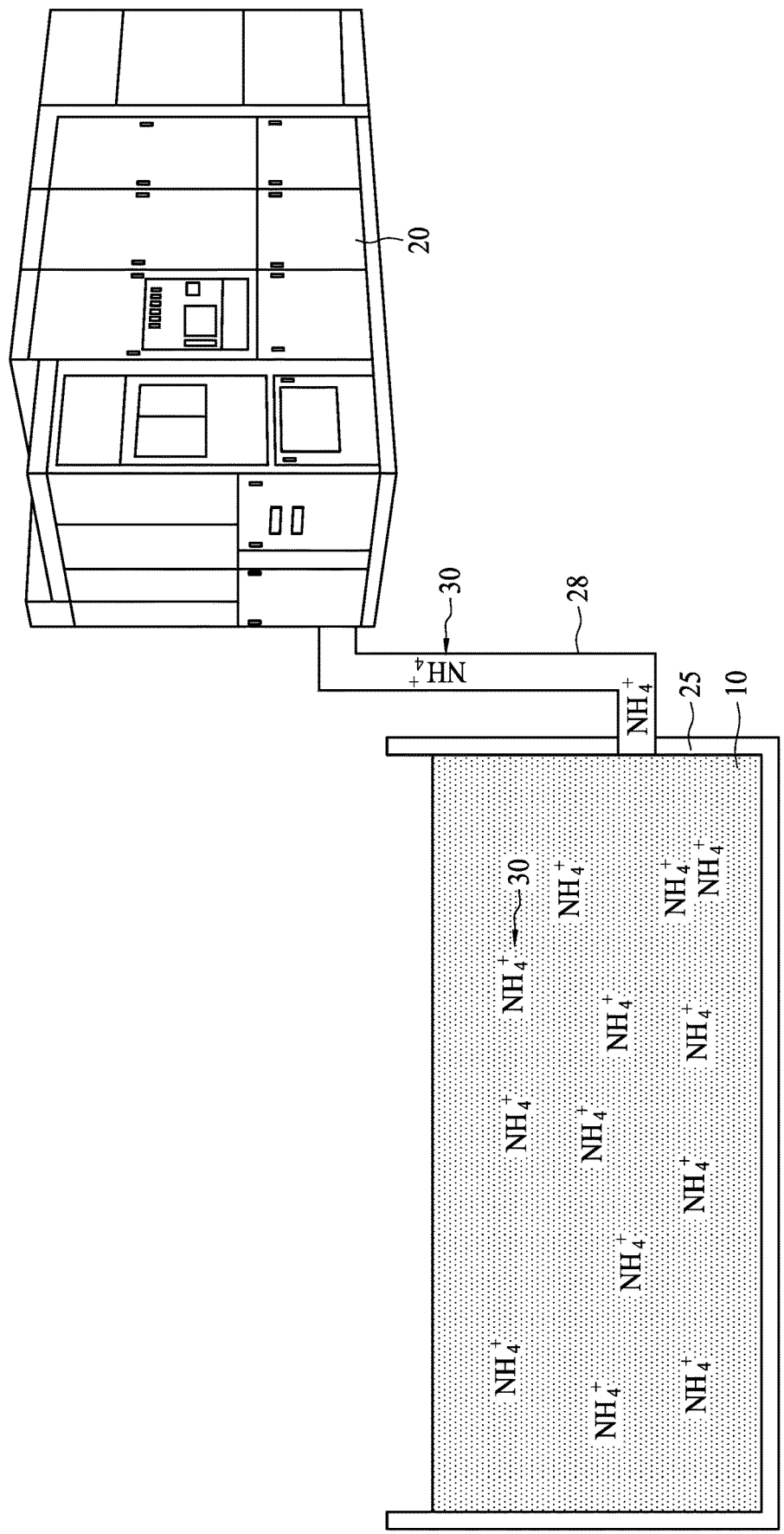
FIGS. 3 to 11 and 13 are schematic views illustrating sequential operations of the method shown in FIG. 2, in accordance with some embodiments of the present disclosure.

In operation 201 of FIG. 2, a liquid 10 is collected from a semiconductor fabrication machine 20, as shown in FIG. 3. The semiconductor fabrication machine 20 may be a semiconductor production tool such as a photolithographic machine, a etch machine, a deposition machine, an ion-implantation machine, and the like. The liquid 10 may be discharged by the semiconductor fabrication machine 20 and transported to a wastewater collecting device or a wastewater tank 25 through a tube 28. In some embodiments, the liquid 10 includes an ammonia nitrogen wastewater. The liquid 10 may include ammonium ions 30. The ammonium ions 30 are generated from the semiconductor fabrication machine 20 and transported to the wastewater collecting device 25 by the tube 28. The liquid 10 may be an aqueous medium including the ammonium ions 30.

Figure 4:
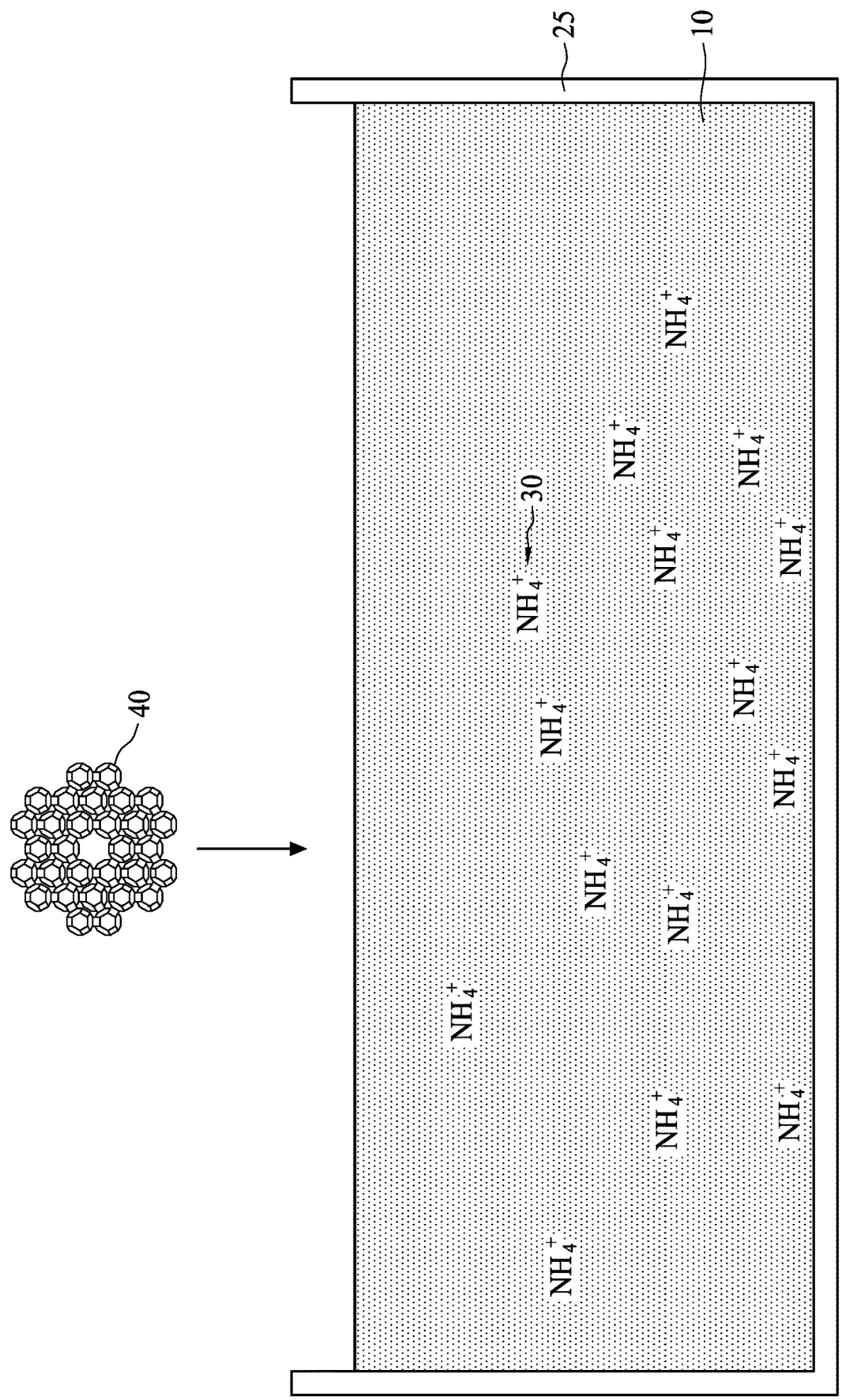
Figure 5:
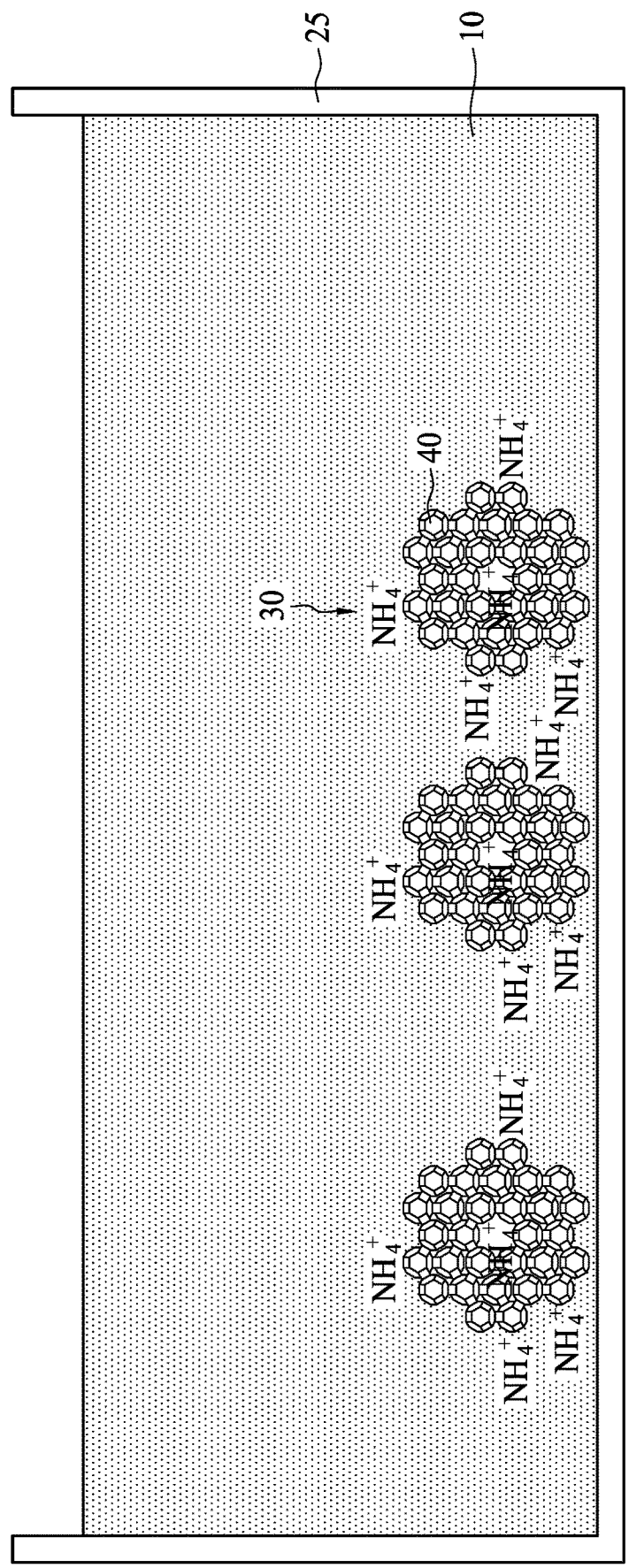
Figure 6:
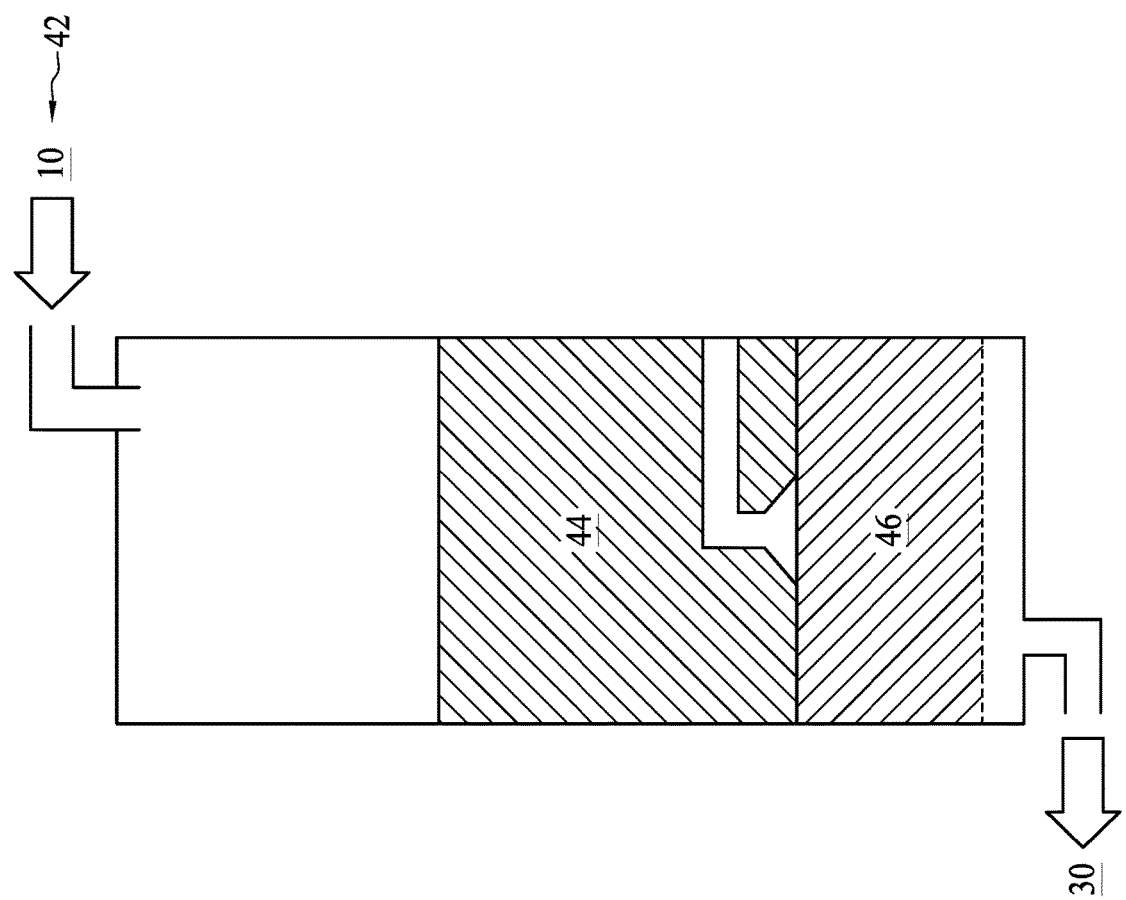

In operation 203 of FIG. 2, the ammonium ions 30 in the liquid 10 are adsorbed, as shown in FIGS. 4 to 6. Referring to FIG. 4, in some embodiments, a plurality of zeolites 40 are added to the liquid 10. The zeolites 40 are microporous, aluminosilicate minerals commonly used as adsorbents and catalysts. The zeolites 40 may be tetrahedral, three dimensional, crystalline minerals of aluminosilicate earth metals and belong to the acidic catalysts. The zeolites 40 have a porous structure that can accommodate a wide variety of ions, such as $Na^+$, $K^+$, $Ca^{2+}$, $Mg^{2+}$ and other cations. These positive ions are rather loosely held and can readily be exchanged for others in a contact solution. In some embodiments, the zeolites 40 includes analcime, chabazite, clinoptilolite, heulandite, natrolite, phillipsite or stilbite. In some embodiments, each of the zeolites 40 has a pore size less than 100 nanometers (nm).

Referring to FIG. 5, the ammonium ions 30 are adsorbed by the zeolites 40. An adsorption is the adhesion of atoms, ions or molecules from a gas, liquid or dissolved solid to a surface. This process may create a film of the adsorbate on the surface of the adsorbent. One zeolite 40 may trap one or more ammonium ions. In some cases, an aluminum oxide ($Al_2O_3$) compound may be used to adsorb the ammonium ions 30.

In some other embodiments, instead of adding the zeolites 40 to the wastewater tank 25 holding the liquid 10, the liquid 10 is passed through a column filled with the zeolites 40. The ammonium ions 30 may also be trapped by the zeolites 40 in the column.

Referring to FIG. 6, in some embodiments, the liquid 10 is supplied to an ion exchange device 42. In some embodiments, the ion exchange device 42 includes a cation exchange resin 44 and/or an anion exchange resin 46. The order of setting of the cation exchange resin 44 and the anion exchange resin 46 is not limited. In some embodiments, the liquid 10 first passes through the cation exchange resin 44 and then the anion exchange resin 46. In some other embodiments, the liquid 10 first passes through the anion exchange resin 46 and then the cation exchange resin 44. The cation exchange resin 44 and the anion exchange resin 46 are ion exchangers. The cation exchange resin 44 may be used to adsorb the ammonium ions 30 based on the principle of ion exchange, and the anion exchange resin 46 may be used to adsorb anions. After the liquid 10 passes through the ion exchange device 42, a solution having a higher concentration of ammonium ions 30 are discharged. In some other embodiments, a reverse osmosis membrane apparatus or an electrical deionization apparatus (not shown) is used instead of the ion exchange device 42.

Figure 7:
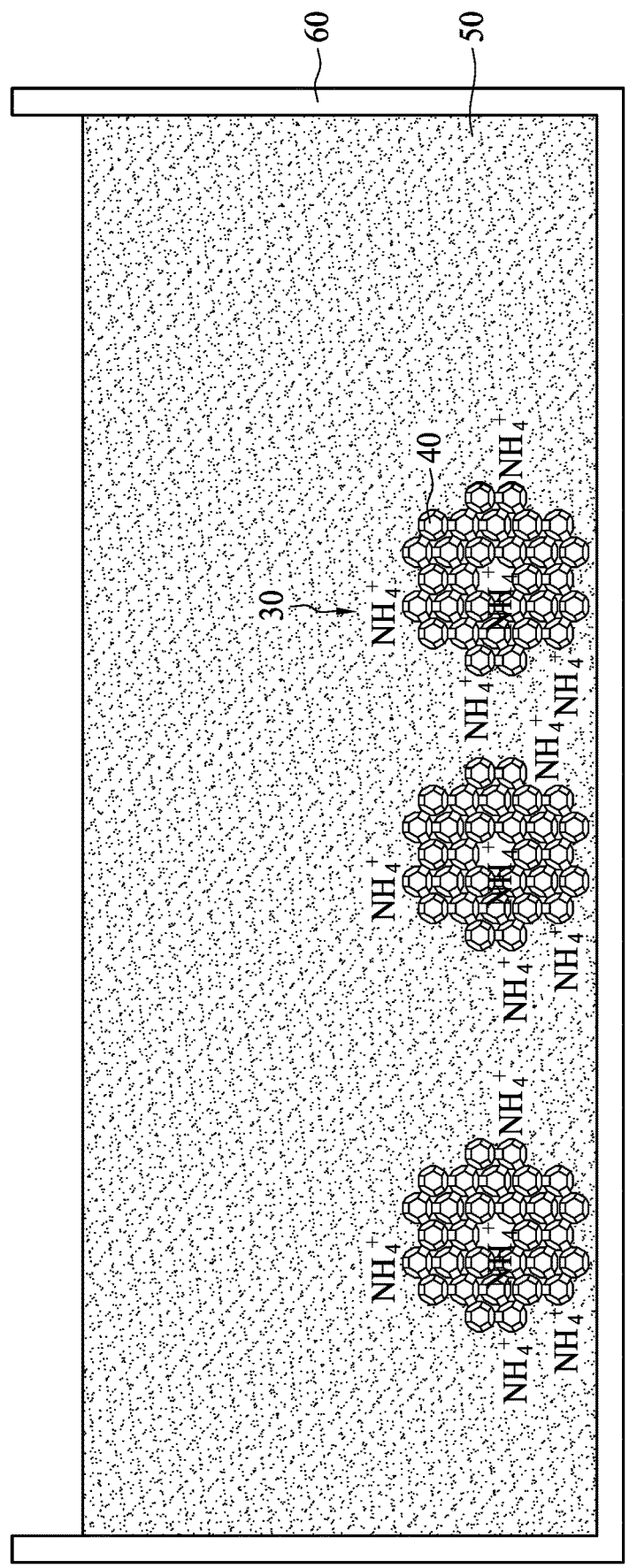

In operation 205 of FIG. 2, the adsorbed ammonium ions 30 are transferred to an aqueous solution 50, as shown in FIG. 7. In some embodiments, the aqueous solution 50 is a saline solution including sodium ions ($Na^+$) and chloride ions ($Cl^-$). The aqueous solution 50 may be replaced with pure water or deionized water (DI water) in some other embodiments. In some embodiments, after the adsorption of the ammonium ions 30 by the zeolites 40, aluminum oxide or ion exchange resin is saturated, the ammonium ions 30 adsorbed by the zeolites 40 are transferred to an alkali-acid system 60 holding the aqueous solution 50. Acids or bases may be repeatedly added to the alkali-acid system 60. The purpose of transferring the ammonium ions 30 adsorbed by the zeolites 40 to a relatively clean solution or pure water is to get rid of undesired materials from the liquid That is, a preliminary purification operation may be performed on the liquid 10 to obtain a higher concentration of ammonium ions 30.

Figure 8:
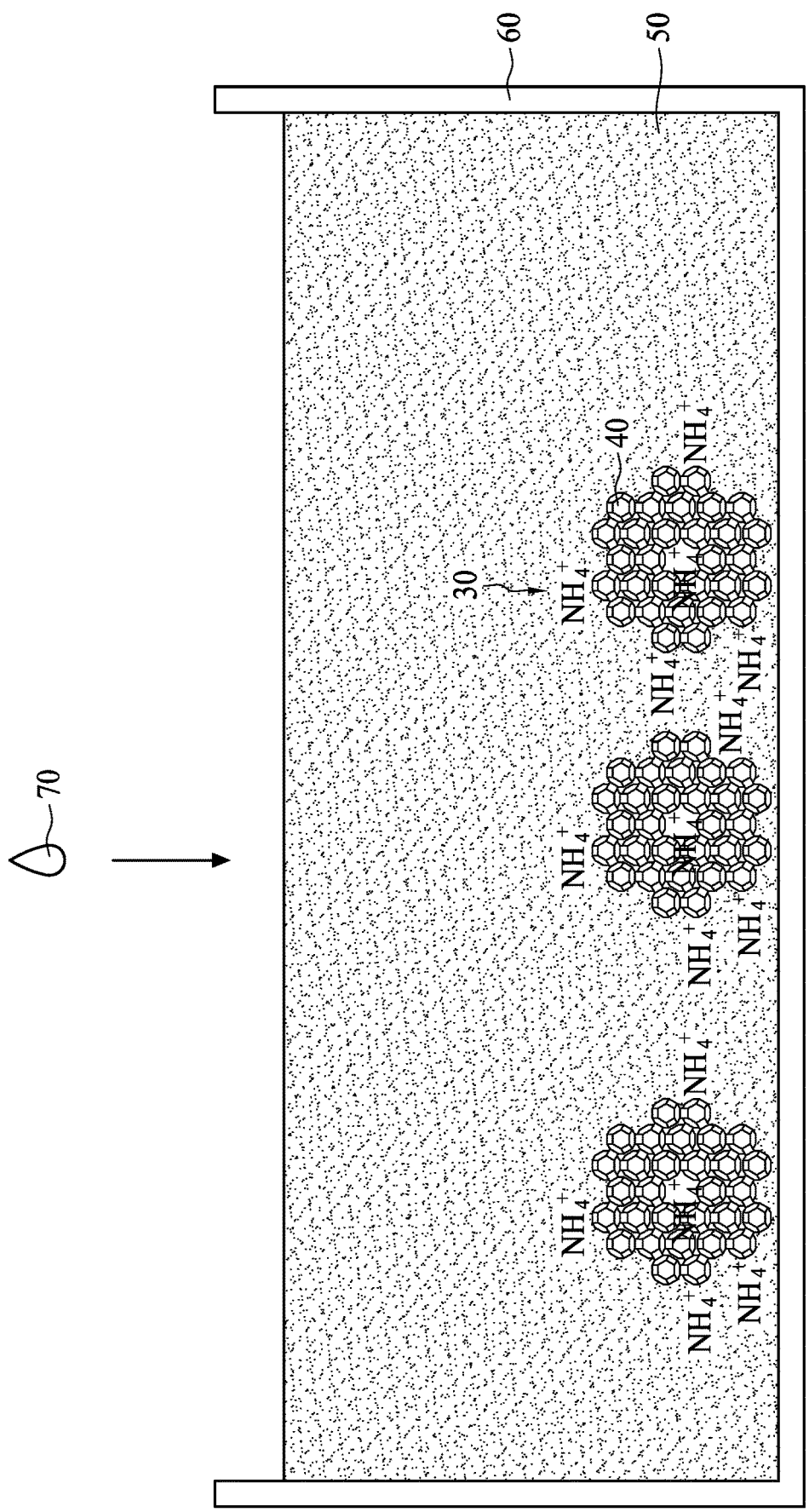

In operation 207 of FIG. 2, the ammonium ions 30 are desorbed in the aqueous solution 50 and converted into ammonia molecules 90, as shown in FIGS. 8 to 11. Referring to FIG. 8, in some embodiments, an acidic solution 70 is added to the aqueous solution 50 in the alkali-acid system 60. In some embodiments, the acidic solution 70 includes sulfuric acid ($H_2SO_4$), hydrochloric acid (HCl) or other suitable acids. After the addition of the acidic solution 70, a pH value of the aqueous solution 50 is decreased. In some embodiments, the acidic solution 70 is used to desorb the ammonium ions 30 from the zeolites 40. In some other embodiments, instead of adding the acidic solution 70 to the alkali-acid system 60 holding the aqueous solution 50, the aqueous solution 50 is added to a container holding the acidic solution 70. The ammonium ions 30 may also be released from the zeolites 40.

Figure 9:
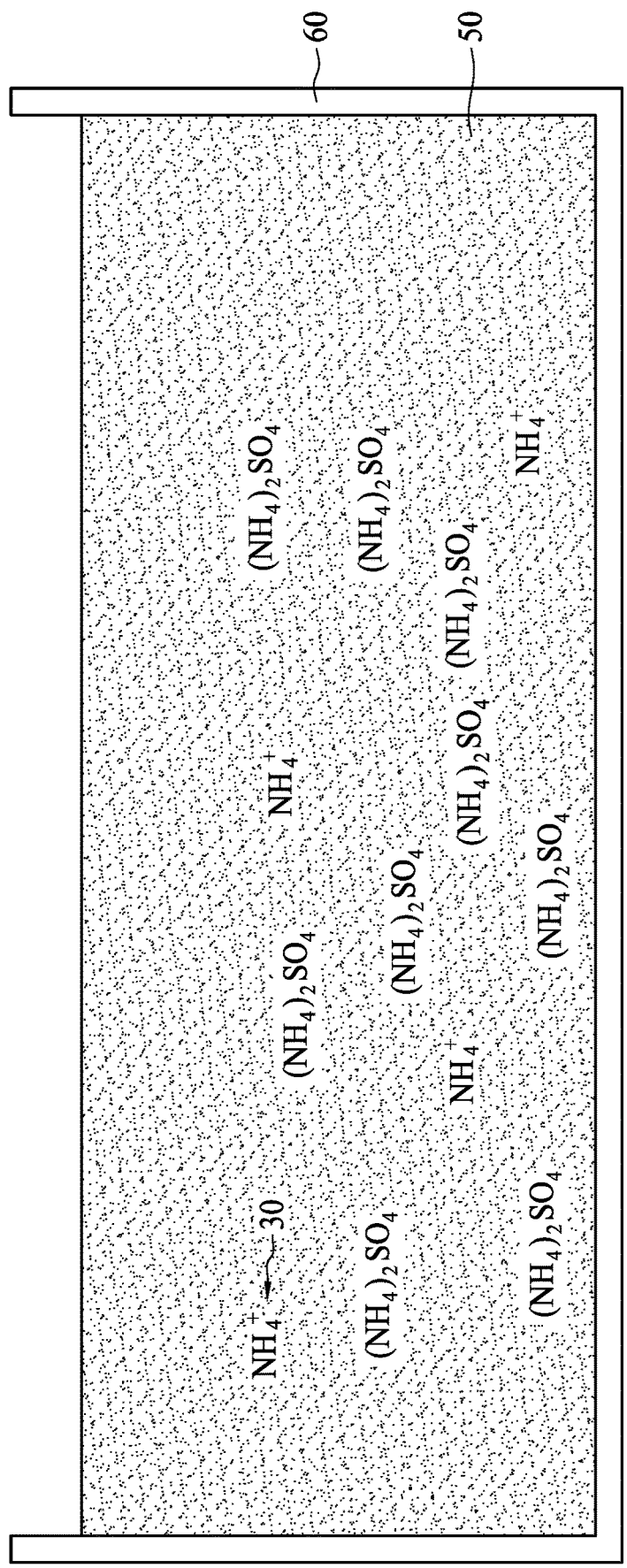

Referring to FIG. 9, in some embodiments, the zeolites 40 are removed. When the acidic solution 70 is sulfuric acid, the ammonium ions desorbed from the zeolites 40 may have a salt form of $(NH_4)_2SO_4$ or free $NH_4^+$. The $(NH_4)_2SO_4$ may equilibrate with $NH_4^+$ and $SO_4^{2-}$. When the acidic solution 70 is hydrochloric acid, the ammonium ions 30 desorbed from the zeolites 40 may have a salt form of $NH_4Cl$ or free $NH_4^+$. The $NH_4Cl$ may equilibrate with $NH_4^+$ and $Cl^-$. That is, the ammonium ions 30 in the aqueous solution 50 can be released from the zeolites 40 by the addition of the acidic solution 70. In some embodiments, after the desorption of the ammonium ions 30 to the aqueous solution 50, the concentration of the ammonium ions 30 in the aqueous solution 50 is greater than the concentration of the ammonium ions 30 in the liquid 10. That is, the ammonium ions 30 in the liquid 10 have a first concentration, and the ammonium ions 30 in the aqueous solution 50 have a second concentration greater than the first concentration. In some embodiments, the first concentration is increased to the second concentration after the adsorption and the desorption of the ammonium ions 30.

Figure 10:
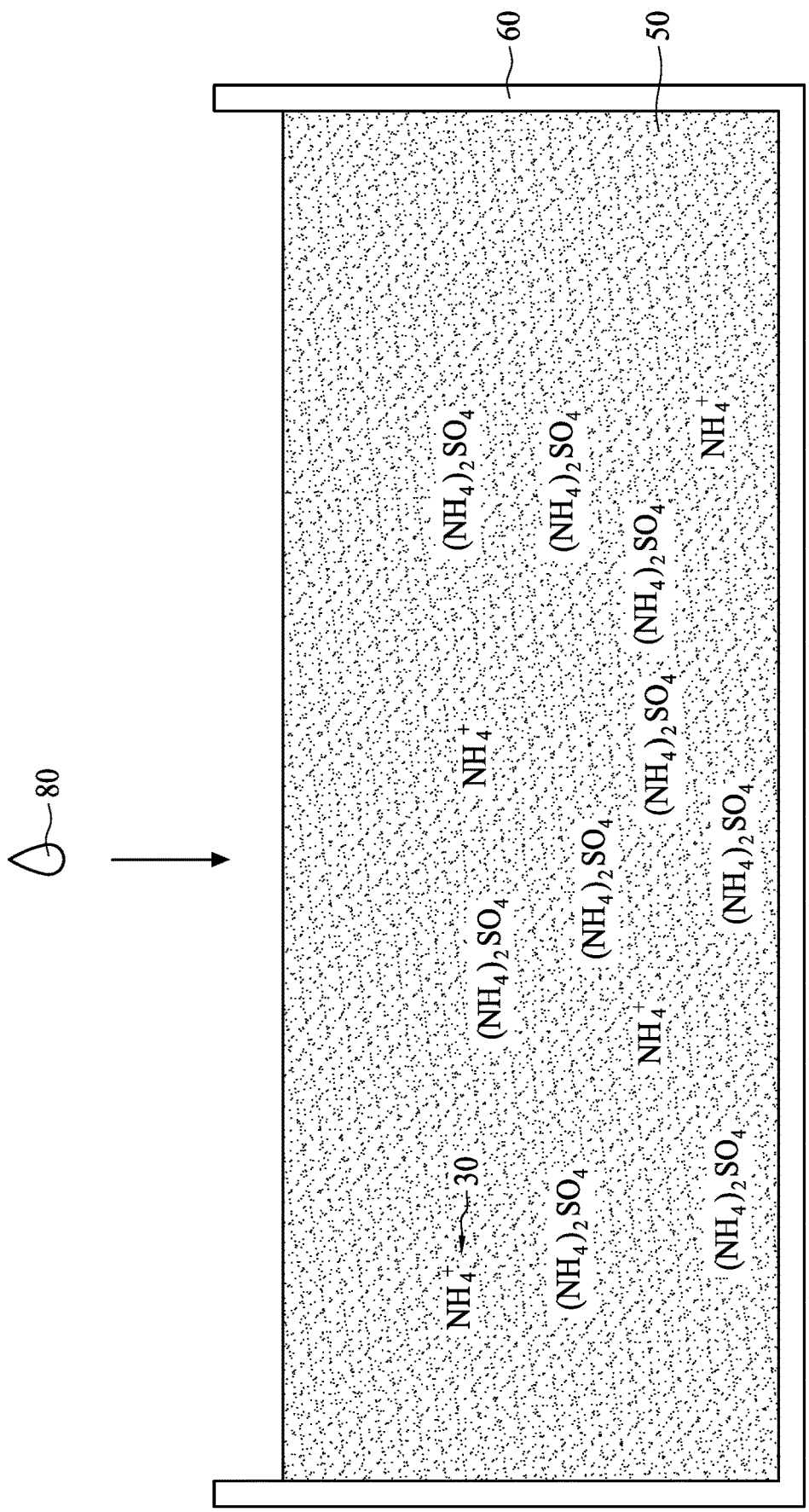

Referring to FIG. 10, in some embodiments, an alkaline solution is added to the aqueous solution 50 in the alkali-acid system 60. In some embodiments, the alkaline solution 80 includes sodium hydroxide or potassium hydroxide (KOH) or other suitable bases. After the addition of the alkaline solution 80, the pH value of the aqueous solution 50 is raised.

Figure 11:
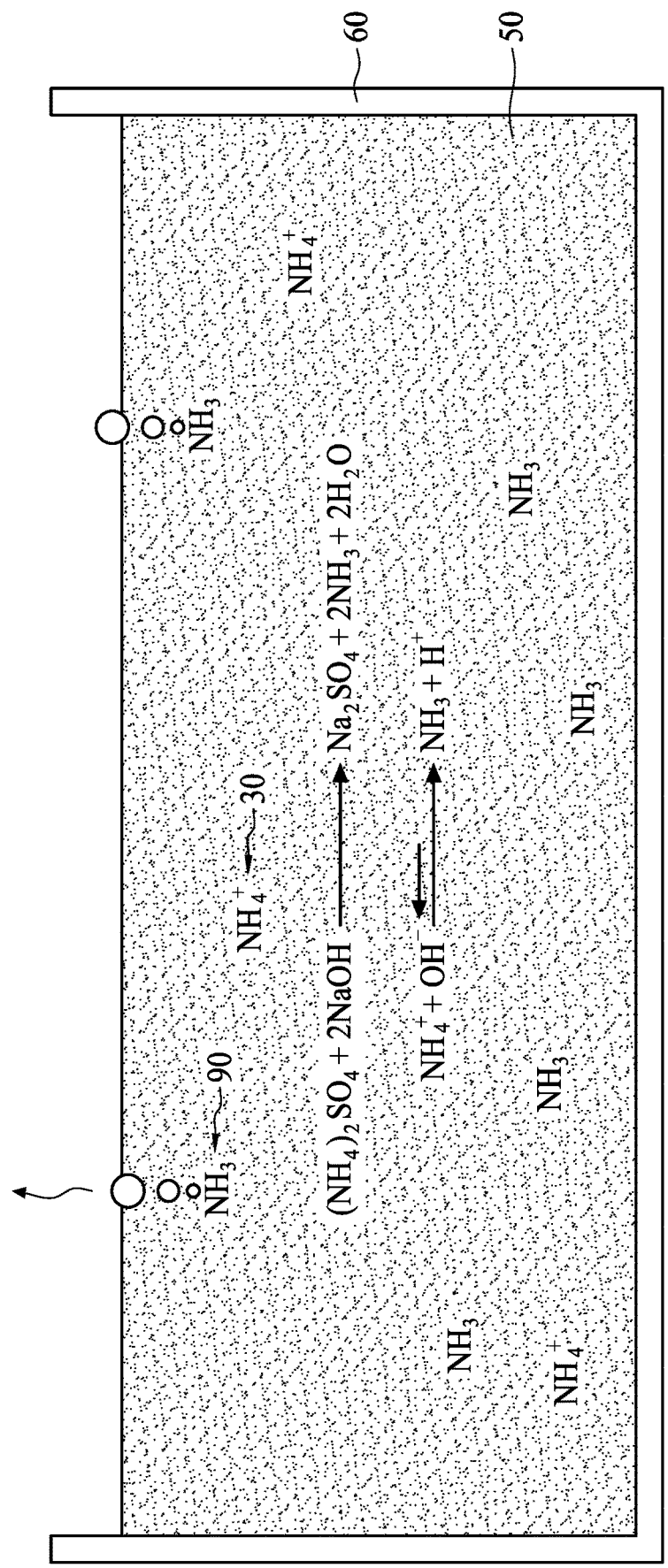

Referring to FIG. 11, in some embodiments, after the addition of the alkaline solution 80, an acid-base reaction may occur between a salt of, for example, $(NH_4)_2SO_4$ and the alkaline solution 80, for example, NaOH. In such embodiments, the ammonium sulfate is the acid and the sodium hydroxide is the base. The above acid-base reaction can be expressed in equation (1):

$$(NH_4)_2SO_4 + 2NaOH \rightarrow Na_2SO_4 + 2NH_3 + 2H_2O \qquad \text{equation (1)}$$

In some embodiments, an acid-base reaction may occur between $NH_4^+$ and $OH^-$. In such embodiments, the ammonium ion is the acid and the hydroxide is the base. The above acid-base reaction can be expressed in equation (2):

$$NH_4^+ + OH^- \leftrightharpoons NH_3 + H^+ \qquad \text{equation (2)}$$

According to equation (1) or equation (2), ammonia molecules 90 may be produced. $NH_4^+$ may be deprotonated, that is, the removal of a proton ($H^+$) by $OH^-$ to form $NH_3$. Both sodium hydroxide and potassium hydroxide are alkaline enough and can be used to deprotonate the ammonium ions 30. In some embodiments, the ammonium ions 30 are converted to the ammonia molecules 90 after the alkaline solution 80 is added to the aqueous solution 50. The alkali-acid system 60 may be referred to as an ammonia-extraction system. The ammonia molecules 90 may be extracted in a gas form. However, since ammonia is dissolvable in water, both $NH_3$ and $NH_4^+$ may be present in the aqueous solution 50. Equation (2) is a chemical equilibrium between $NH_4^+$ and $NH_3$. $NH_4^+$ is a conjugate acid of $NH_3$, and $NH_3$ is a conjugate base of $NH_4^+$. The equilibrium constant $K_b$ of equation (2) is about $1.8 \times 10^{-5}$ at room temperature. The chemical equilibrium may be shifted to either direction according to an added agent. For example, when more alkaline solution 80 is added to the system of $NH_4^+$ and $NH_3$, the chemical equilibrium will shift to the $NH_3$ direction. That is, more ammonia molecules 90 will be formed.

Figure 12:
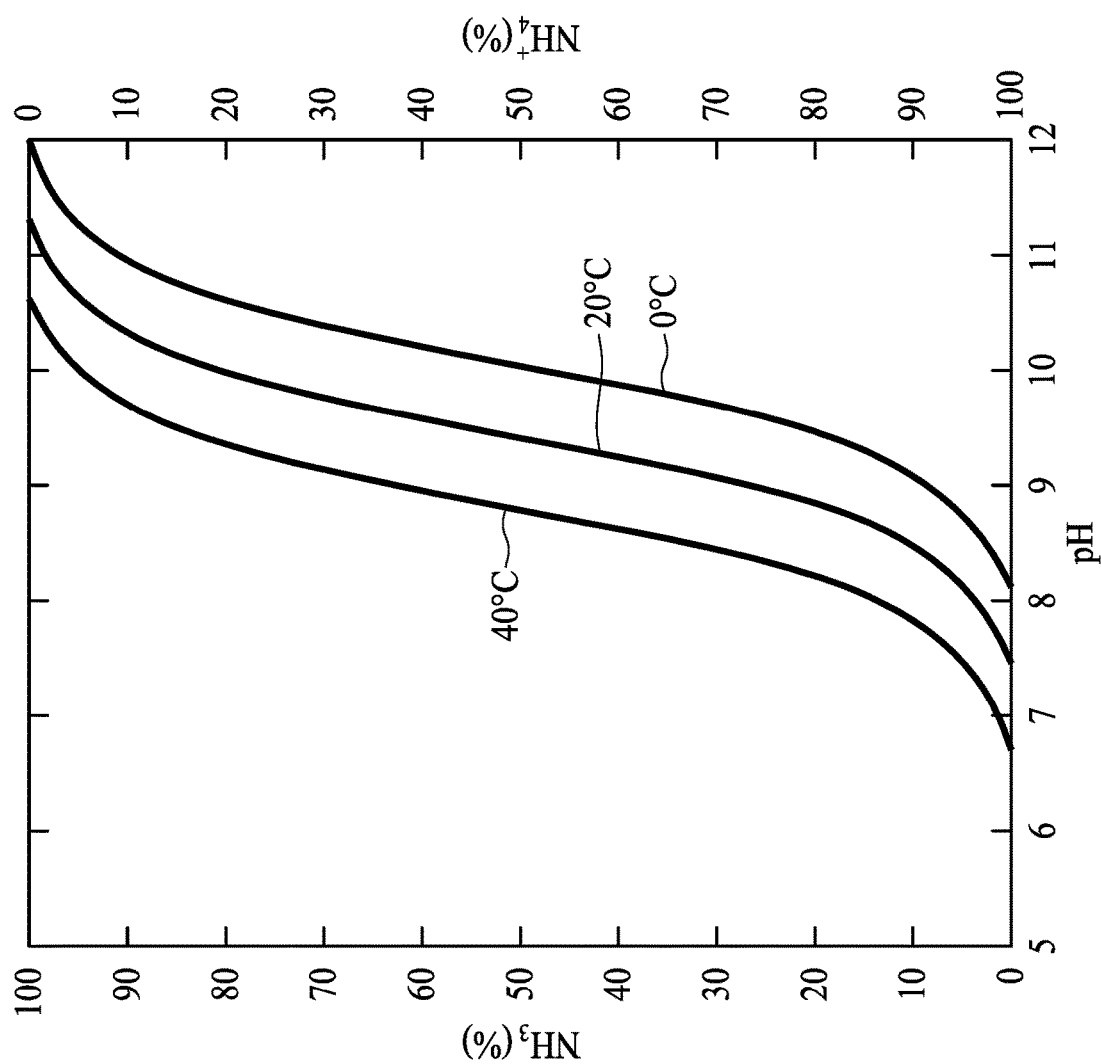
FIG. 12 is a graph showing a relative amount of $NH_4^+$ and $NH_3$ as a function of pH value and temperature, in accordance with some embodiments of the present disclosure.

FIG. 12 is a graph showing a relative amount of $NH_4^+$ and $NH_3$ as a function of pH value and temperature. The relative amount of $NH_4^+$ or $NH_3$ is both pH-dependent and temperature-dependent. The x-axis is the pH value, and the y-axis is the amount of $NH_4^+$ or $NH_3$. The sum of the relative amount of $NH_4^+$ and the relative amount of $NH_3$ is defined as 100%. In some embodiments, at 20° C. and pH=11, the relative amount of $NH_3$ is about 97%, and the corresponding relative amount of $NH_4^+$ is about 3%. In some embodiments, at 40° C. and pH=10, the relative amount of $NH_3$ is also about 95%, and the corresponding relative amount of $NH_4^+$ is about 5%. In some embodiments, before a subsequent electrolysis (decomposition) of the ammonia molecules 90, the pH value of the aqueous solution 50 is increased to be greater than 11 at room temperature (for example, 20° C.) or greater than 10 at 40° C. such that an enough amount of the ammonia molecules 90 is present for the electrolysis. In such embodiments, the amount of the ammonia molecules 90 is about 9 to 10 times the amount of the ammonium ions 30. That is, a fraction of ammonia molecules 90/(ammonia molecules 90+ammonium ions 30) is greater than 90% before the electrolysis of the ammonia molecules 90. The fraction may be adjusted by the added amount of the alkaline solution 80 to control the pH value of the aqueous solution 50. The fraction may also be adjusted by controlling the temperature of the aqueous solution 50.

Electrolysis is a method that uses a direct current (DC) to drive a non-spontaneous chemical reaction. This technique is commercially significant as a stage in the separation of elements from naturally occurring sources such as ores using an electrolytic cell. The fundamental process of electrolysis is the interchanging of ions and atoms by the addition or removal of electrons from the external circuit. Ionic compounds contain charged particles called ions. For example, sodium chloride contains positively charged sodium ions and negatively charged chlorine ions. The ions must be free to move in order to start the electrolysis process. When an ionic substance is dissolved in water or melted then the ions are free to move. During electrolysis, positively charged ions move to the negative electrode and negatively charged ions move to the positive electrode. Then positively charged ions receive electrons and negatively charged ions lose electrons. Both the products of the dissociation get collected at the electrodes. For instance, if electricity is passed through molten sodium chloride, the sodium chloride is broken into sodium and chlorine, and they collect at their respective electrodes. The metals get precipitated and the gases escape. This ability to break down substance with a current is used in many ways. Electrolysis is widely used for electroplating. Electrolysis of water is the decomposition of water into oxygen and hydrogen gas. This is achieved by passing an electric current through the water. Two electrodes are placed in the container with water. The electric current is passed through these electrodes. Stainless steel or platinum are used for the making of the electrodes. The negatively charged electrode that is cathode is the place where the hydrogen will get accumulated while the positively charged electrode that is anode is the place where the oxygen will get accumulated. Electrolysis of water is also an example of decomposition which is also known as electrolytic decomposition.

Figure 13:
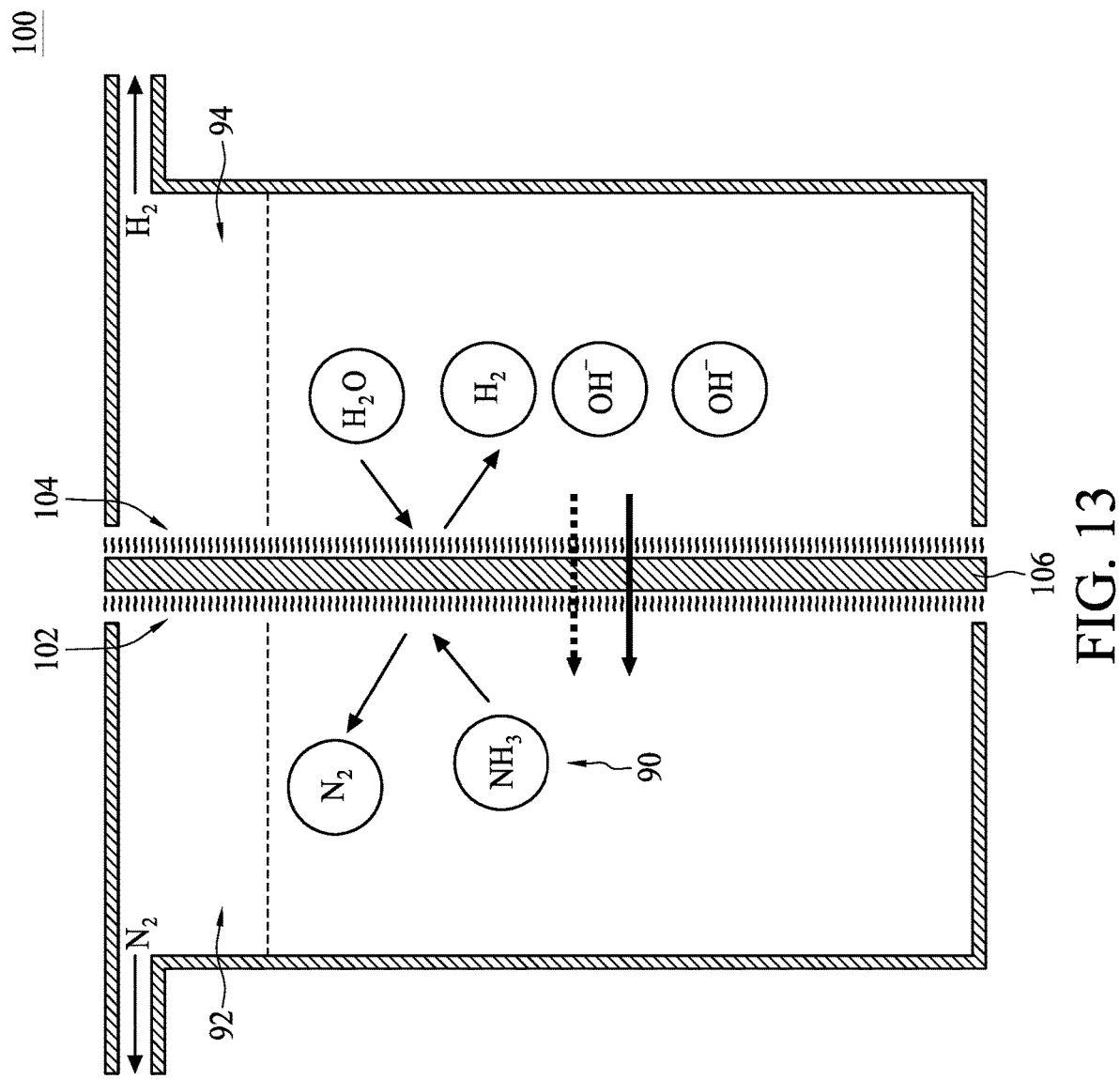

In operation 209 of FIG. 2, the ammonia molecules 90 are electrolyzed, as shown in FIG. 13. In some embodiments, the ammonia molecules 90 are transported to an electrolyzing system 100. The electrolyzing system 100 includes an anode 102, a cathode 104 and an electrolyte membrane 106 separating the anode 102 and the cathode 104. The electrolyte membrane 106 may be a polymer electrolyte membrane. A direct circuit (DC) power supply (not shown) is electrically connected to the electrolyzing system 100. In some embodiments, the electrolyzing system 100 adopts a precious metal such as platinum (Pt), rhodium (Rh) or iridium (Ir) as a catalyst. For example, bifunctional platinum nanocubes may be used as an electrocatalyst for the electrolysis of the ammonia molecules 90. When the power supply provides sufficient electricity to run the electrolyzing system 100, the ammonia molecules 90 are decomposed into nitrogen molecules 92 and hydrogen molecules 94. The nitrogen molecules 92 are produced at the anode 102, and the hydrogen molecules 94 are produced at the cathode 104. In some embodiments, the hydrogen molecules 94 are above 99.7% purity.

Faraday's law can be utilized to quantify the amount of the hydrogen molecules 94 produced from the ammonia molecules 90 at a particular current. The equation is described as follows:

$$m = \frac{s \times M \times I \times t}{n \times F}$$

in which m is the mass of the produced hydrogen molecules 94 (gram), s is a stoichiometric factor=3 (mol), M is the molecular weight of hydrogen gas=2 (g mol$^{-1}$), I is the applied current (A), t is the electrolysis time (second, s), n is the equivalent mole=6 (eq), and F is Faraday's constant=96480 (A·s·eq$^-$). The values of s and n in the above equation are for the ammonia electrolysis process described below.

At the anode 102, an oxidation reaction of the ammonia molecules occurs:

$$2NH_3 + 6OH^- \rightarrow N_2 + 6H_2O + 6e^- \qquad \text{equation (3),}$$

E=−0.77 V vs SHE.
SHE means the standard hydrogen electrode.
At the cathode 104, a reduction reaction of water occurs:

$$6H_2O + 6e^- \rightarrow 3H_2 + 6OH^- \qquad \text{equation (4),}$$

E=−0.82 V vs SHE.
The Overall Reaction:

$$2NH_3 \rightarrow N_2 + 3H_2 \qquad \text{equation (5),}$$

E=−0.059 V vs SHE.

When the pH value of aqueous solution 50 is adjusted to be above 11 at room temperature or the pH value is above 10 at 40° C., under one of these two conditions, the species in the chemical equilibrium between $NH_4^+$ and $NH_3$ can be more than 90% in the form of the ammonia molecules 90 ($NH_3$). Subsequently, the electrolysis of the ammonia molecules 90 is performed to decompose the ammonia molecules 90 to produce the nitrogen molecules 92 and the hydrogen molecules 94.

In some embodiments, the electrolysis of the ammonia molecules is performed under a condition that keeps the pH value of the aqueous solution 50 greater than 11 at room temperature. In some other embodiments, the electrolysis of the ammonia molecules 90 is performed under a condition that keeps the pH value of the aqueous solution 50 greater than at or over 40° C. In some other embodiments, during the electrolysis (decomposition) of the ammonia molecules 90, in the aqueous solution 50, the ammonium ions 30 keep equilibrating with the ammonia molecules 90, as shown in equation (2). In other words, once the produced $NH_3$ leaves the aqueous solution 50, the $NH_4^+$ equilibrates to timely supplement the $NH_3$.

The nitrogen molecules 92 and the hydrogen molecules 94 can be respectively transported to nitrogen or hydrogen storage systems or fuel supply systems by pipelines. In addition, the produced hydrogen molecules 94 can be supplied to a semiconductor production tool or a semiconductor fabrication machine through the hydrogen storage system. Furthermore, in some cases, the produced hydrogen molecules 94 which have sufficient purities can be directly transported to the semiconductor production tool or the semiconductor fabrication machine through a gas transport system or a pipelines. The above semiconductor production tool or the semiconductor fabrication machine may be different from or the same as the semiconductor fabrication machine 20 shown in FIG. 3.

Ammonia nitrogen wastewater is originally to be removed after its treatment. The present disclosure provides a method which can both treat the Ammonia nitrogen wastewater and produce hydrogen gas. The method can reduce the treatment cost of ammonia nitrogen wastewater and also reduce the production cost of hydrogen production on by electrolysis of water. Ammonia nitrogen wastewater treatment needs to add liquid alkali to adjust the pH first, so that the ammonium ions in the water are converted into gaseous ammonia molecules. Sulfuric acid is added to convert the gaseous ammonia to ammonium sulfate after degassing.

Hydrogen gas has been adopted as a material in processes throughout the fab. For example: epitaxy, deposition, plasma etch, anneal, passivation, ion implantation, or carrier gas. In addition, EUV lithography adds to increasing hydrogen demand at leading-edge fabs. For the importance of hydrogen, several providing ways to guarantee the quantity. On-site hydrogen electrolysis uses direct current electricity to split water into hydrogen and oxygen. Electrolysis is relatively expensive since a great amount of electricity is needed to break water molecule bonds.

The ammonium ion in the ammonia nitrogen wastewater treatment system is released into a high-concentration ammonium ion liquid after being adsorbed by the adsorption material, and the pH is adjusted to more than 11 at room temperature, or the pH is adjusted to more than 10 at 40° C., and the ammonium ion is converted into gaseous ammonia molecules, which are decomposed into hydrogen and nitrogen by electrolysis reaction. Hydrogen can be used as backup capacity or incorporated into the hydrogen supply system for use in the process. After the process is used, the hydrogen can be incorporated into the fuel supply system to reduce fuel consumption.

Advantages of the present disclosure include directly treating the wastewater in a semiconductor factory or plant and converting the wastewater into a key substance, that is, hydrogen gas required for some semiconductor operations. The method of the present disclosure provides a stable source of hydrogen in the plant and increase the diversity of raw material supply, which can effectively reduce waste disposal costs, reduce hydrogen source equipment setup costs, and reduce hydrogen production costs. In addition to being used as a substance, the hydrogen gas can be burned for energy use. The ammonia nitrogen wastewater after treatment, can be considered as a stock of hydrogen.

One aspect of the present disclosure provides a method of processing a liquid containing ammonia nitrogen from a first semiconductor fabrication machine. The method includes: adsorbing a plurality of ammonium ($NH_4^+$) ions in the liquid; desorbing the plurality of $NH_4^+$ ions to a solution; converting a fraction of the plurality of $NH_4^+$ ions into a plurality of ammonia ($NH_3$) molecules; and electrolyzing the plurality of $NH_3$ molecules to become a plurality of hydrogen ($H_2$) molecules and a plurality of nitrogen ($N_2$) molecules.

One aspect of the present disclosure provides a method for producing hydrogen gas from a liquid containing ammonia nitrogen. The method includes: collecting the liquid from a semiconductor fabrication machine; adsorbing a plurality of $NH_4^+$ ions in the liquid; desorbing the plurality of $NH_4^+$ ions to a solution; increasing a temperature of the solution to be greater 40° C.; deprotonating the plurality of $NH_4^+$ ions to form a plurality of $NH_3$ molecules in the solution by adjusting a pH value of the solution at the temperature to be greater than 10; and decomposing the plurality of $NH_3$ molecules into a plurality of $H_2$ molecules and a plurality of $N_2$ molecules.

One aspect of the present disclosure provides a method for providing hydrogen gas to a semiconductor production tool. The method includes: providing an aqueous medium having a first concentration of $NH_4^+$ ions; passing the aqueous medium through a zeolite to trap the $NH_4^+$ ions by the zeolite; releasing the $NH_4^+$ ions by placing the $NH_4^+$ ions-adsorbed zeolite in a solution, wherein the released $NH_4^+$ ions in the solution has a second concentration greater than the first concentration; increasing a pH value of the solution to be greater than 11 at room temperature to convert a fraction of the $NH_4^+$ ions into $NH_3$ molecules; electrolyzing the $NH_3$ molecules to produce $H_2$ molecules and $N_2$ molecules; and providing the $H_2$ molecules to the semiconductor production tool.

The foregoing outlines structures of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of processing a liquid containing ammonia nitrogen from a first semiconductor fabrication machine, the method comprising:
   adsorbing a plurality of ammonium ($NH_4^+$) ions in the liquid;
   transferring the plurality of adsorbed $NH_4^+$ ions to an aqueous solution which is substantially neutral;
   adding sulfuric acid to the aqueous solution to desorb the plurality of adsorbed $NH_4^+$ ions by forming a plurality of ammonium sulfate (($NH_4$)$_2SO_4$) molecules in the aqueous solution;
   adding an alkaline solution to the aqueous solution to convert a fraction of the plurality of ammonium sulfate molecules into a plurality of ammonia ($NH_3$) molecules; and
   electrolyzing the plurality of $NH_3$ molecules to become a plurality of hydrogen ($H_2$) molecules and a plurality of nitrogen ($N_2$) molecules.

2. The method of claim 1, further comprising collecting the liquid from the first semiconductor fabrication machine before the adsorption of the $NH_4^+$ ions in the liquid.

3. The method of claim 1, further comprising adjusting a pH value of the solution to be greater than 11 at room temperature.

4. The method of claim 1, further comprising transporting the plurality of $H_2$ molecules to a hydrogen supply system for supplying hydrogen gas to a second semiconductor fabrication machine different from the first semiconductor fabrication machine.

5. The method of claim 1, wherein the plurality of $NH_4^+$ ions are adsorbed by a zeolite or an aluminum oxide ($Al_2O_3$) compound.

6. The method of claim 1, wherein after the desorption of the plurality of $NH_4^+$ ions to the solution, a concentration of the plurality of $NH_4^+$ ions in the solution is greater than a concentration of the plurality of $NH_4^+$ ions in the liquid.

7. The method of claim 1, wherein before the electrolysis of the plurality of $NH_3$ molecules, the fraction is greater than 90%.

8. The method of claim 1, wherein the plurality of ammonium sulfate $((NH_4)_2SO_4)$ react with the alkaline solution in the aqueous solution.

9. A method for producing hydrogen gas from a liquid containing ammonia nitrogen, the method comprising:
- collecting the liquid from a semiconductor fabrication machine;
- adsorbing a plurality of $NH_4^+$ ions in the liquid;
- transferring the plurality of adsorbed $NH_4^+$ ions to an aqueous solution which is substantially neutral;
- adding sulfuric acid to the aqueous solution to desorb the plurality of adsorbed $NH_4^+$ ions by forming a plurality of ammonium sulfate $((NH_4)_2SO_4)$ molecules in the aqueous solution;
- increasing a temperature of the aqueous solution to be greater than 40° C.;
- adding an alkaline solution to the aqueous solution to convert the plurality of ammonium sulfate molecules into a plurality of ammonia $(NH_3)$ molecules; and
- decomposing the plurality of $NH_3$ molecules into a plurality of $H_2$ molecules and a plurality of $N_2$ molecules.

10. The method of claim 9, further comprising supplying the plurality of $H_2$ molecules to a semiconductor production tool through a hydrogen storage system or a gas transport system.

11. The method of claim 9, wherein a first concentration of the plurality of $NH_4^+$ ions in the liquid containing ammonia nitrogen is increased to a second concentration of the plurality of $NH_4^+$ ions in the aqueous solution after the adsorption and the desorption of the plurality of $NH_4^+$ ions.

12. The method of claim 9, wherein the adsorption of the plurality of $NH_4^+$ ions in the liquid containing ammonia nitrogen includes using a cation exchange resin.

13. The method of claim 9, wherein before the decomposition, a fraction of the plurality of $NH_3$ molecules in the aqueous solution is greater than 90% by adjusting the pH value of the aqueous solution and maintaining the temperature of the aqueous solution.

14. The method of claim 9, wherein the alkaline solution includes sodium hydroxide (NaOH) and potassium hydroxide (KOH).

15. The method of claim 9, wherein the plurality of $NH_3$ molecules are decomposed by electrolysis.

16. The method of claim 9, wherein before the decomposition of the plurality of $NH_3$ molecules, in the solution, an amount of the plurality of ammonia molecules is controlled to be greater than 9 times an amount of the plurality of ammonium ions.

17. A method for providing hydrogen gas to a semiconductor production tool, comprising:
- providing an aqueous medium having a first concentration of $NH_4^+$ ions;
- passing the aqueous medium through a zeolite to trap the $NH_4^+$ ions by the zeolite;
- transferring the $NH_4^+$ ions trapped by the zeolite to an aqueous solution which is substantially neutral;
- adding sulfuric acid to the aqueous solution to release the $NH_4^+$ ions from the zeolite by forming ammonium sulfate $((NH_4)_2SO_4)$ molecules in the aqueous solution;
- increasing a pH value of the aqueous solution to be greater than 11 at room temperature to convert a fraction of the $(NH_4)_2SO_4$ molecules into $NH_3$ molecules;
- electrolyzing the $NH_3$ molecules to produce $H_2$ molecules and $N_2$ molecules; and
- providing the $H_2$ molecules to the semiconductor production tool.

18. The method of claim 17, wherein the zeolite includes clinoptilolite.

19. The method of claim 17, wherein the electrolysis of the $NH_3$ molecules is performed under a condition that keeps the pH value of the solution greater than 11 at room temperature.

20. The method of claim 17, wherein the $NH_3$ molecules are electrolyzed under a condition of pH value greater than 10 at or temperature greater than 40° C.

* * * * *